United States Patent [19]

Taylor

[11] Patent Number: 4,800,970
[45] Date of Patent: Jan. 31, 1989

[54] FLEXIBLE BEAM MECHANICAL WEIGHING SCALE

[75] Inventor: Michael P. Taylor, Norwalk, Conn.

[73] Assignee: Pitney Bowes Inc., Stamford, Conn.

[21] Appl. No.: 125,850

[22] Filed: Nov. 27, 1987

[51] Int. Cl.⁴ .................. G01G 3/08; G01G 23/14; G01G 1/18

[52] U.S. Cl. .................. 177/229; 177/172; 177/251

[58] Field of Search .......... 177/148, 225, 229, 251, 177/172

[56] References Cited

U.S. PATENT DOCUMENTS

| 243,753 | 7/1881 | Barton | 177/251 X |
| 3,334,698 | 8/1967 | Von Ronn | 177/251 X |
| 4,281,461 | 8/1981 | Roe | 177/251 X |
| 4,420,056 | 12/1983 | Chapman | |
| 4,643,267 | 2/1987 | Southern | |
| 4,678,049 | 7/1987 | Gummere et al. | 177/229 |

FOREIGN PATENT DOCUMENTS 0424548  2/1935  United Kingdom ............... 177/251

Primary Examiner—George H. Miller, Jr.
Attorney, Agent, or Firm—Peter Vrahotes; Melvin J. Scolnick; David E. Pitchenik

[57] ABSTRACT

A small mechanical weighing scale capable of weighing relatively light, flat articles such as envelopes. The scale contains a slidable pullout flexible beam that is adapted to hold a thin flat article. The tape will break away in accordance with the weight of a held article as the tape is extended from the housing of the scale.

20 Claims, 1 Drawing Sheet

FLEXIBLE BEAM MECHANICAL WEIGHING SCALE

BACKGROUND OF THE INVENTION

In the field of weighing scales, major efforts have been expended to develop scales that are able to weigh objects precisely. Usually these scales are relatively complex and expensive. There are certain activities wherein precise weights are not required, and having an expensive, complex scale for these uses would be inappropriate. When there is an activity where precise weights are not required, there is a need for an inexpensive, simple, generally accurate scale. An example of such activity is in the weighing of mail pieces such as letters and small parcels. Other purposes where such a scale could be beneficial would be in the weighing of objects that are sold per unit weight, such as nuts, granular candles, seeds, and the like. More specifically, where an object is to have a price based upon the weight of the thereof within a given range and it is not critical that the exact weight be known, such a scale would be of benefit.

SUMMARY OF THE INVENTION

A small mechanical weighing scale has been conceived that is simple in construction, economical to fabricate, and reliable to the extent necessary for certain activities. The scale relies upon the bending beam principle. An object to be weighed is placed at the end of a flexible beam, and the beam is extended over a fulcrum until such time as it breaks away, bends or folds suddenly. Emperically, a relationship between the length of the beam before breaking away, and the weight of an article can be derived.

BRIEF DESCRIPTION OF THE DRAWINGS

The invention will be more fully understood with reference to the drawings in which.

DETAILED DESCRIPTION OF THE PREFERRED EMBODIMENT

Figure 1:
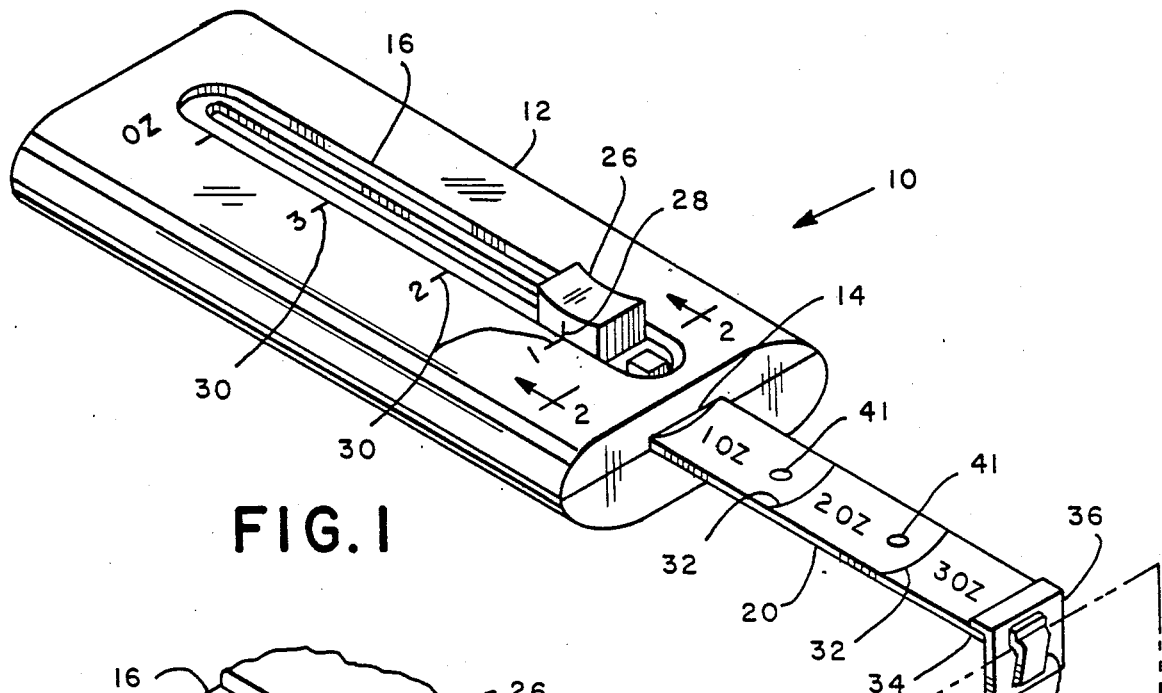
FIG. 1 shows a perspective view of a weighing scale that incorporates the instant invention.
Figure 2:
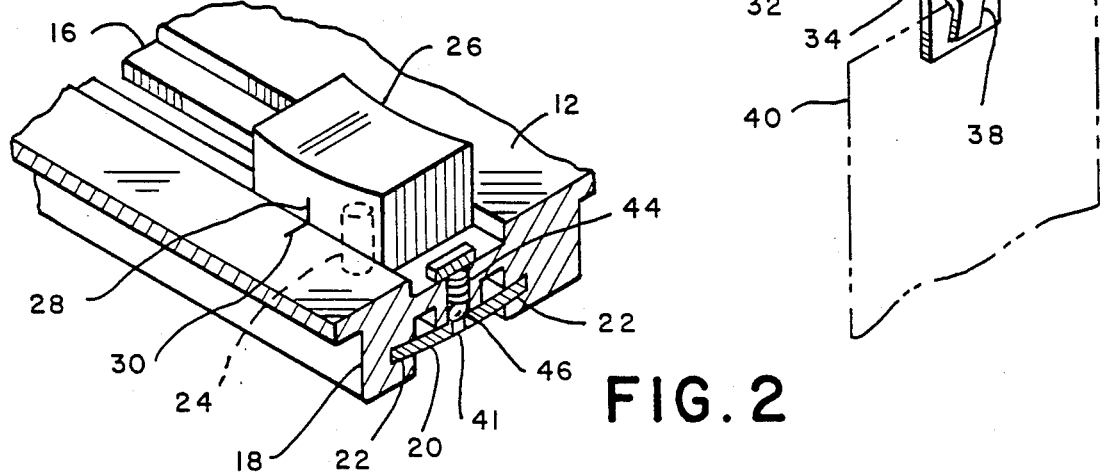
FIG. 2 is an expanded view, partially in section, of a portion of the weighing scale shown in FIG. 1.
Figure 3:
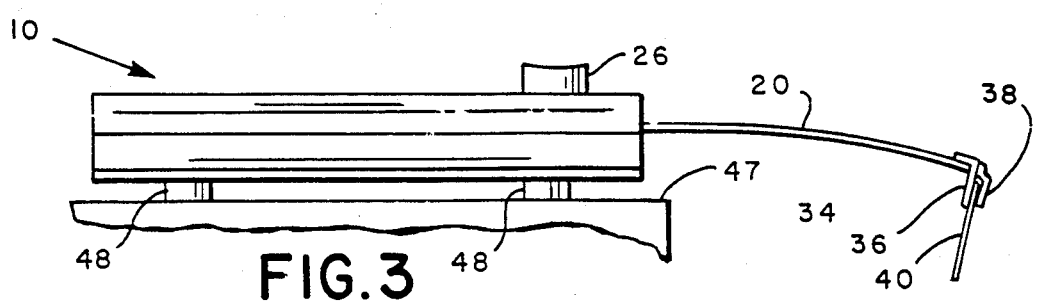
FIG. 3 is a side elevational view of the weighing scale shown in FIG. 1 disposed upon a support.

Referring now to FIGS. 1-3, a weighing scale that incorporates the principles of the instant invention is shown generally at 10 and includes a housing 12 having first and second openings, 14,16, respectively, the second opening being counter sunk. A channel 18 is located within the housing 12 and receives a thin flexible beam 20 within oppositely spaced, longitudinal grooves 22. The flexible beam 20 has a curvilinear cross section and extends through the first opening 14.

The flexible beam 20 has a pin 24 affixed thereto that extends through the first or smaller portion of the second opening 16, and a knob 26 is attached by the pin to the flexible beam 20. The other portion of the second opening 16 is sufficiently large to allow the knob 26 to move longitudinally therein so that upon longitudinal movement of the knob 26 the flexible beam 20 will be moved within the channel 18. The knob 26 has a mark 28 thereon that corresponds to marks 30 on the upper surface of the housing 12. Additionally, the flexible beam 20 has marks 32 thereon that correspond to the marks on the knob and housing, 28,30, respectively, the usefullness of which will be described hereinafter. The flexible beam 20 has an exterior portion 34 that always remains outside of the housing 12. Secured to this exterior portion 34 of the flexible beam 20 is a generally inverted L-shaped plate 36 having a clip 38 integral therewith or attached thereto. The clip 38 is adapted to hold a flat lightweight article such as an envelop 40. Extending along the length of the flexible beam intermediate the edges thereof 20 are a series of spaced openings 41. Each opening 41 is located adjacent to a respective one of a mark 32 on the beam 20. Received within an opening 42 of the housing 12 is a spring 44, ball 46 combination, that together with the openings 41, form a detent for the tape 20. The location of the spring, ball combination 44,46 and openings 41 is such that the flexible beam 20 will be detented when a mark 32 on the beam is located at the edge of the opening 14.

Referring now to FIG. 3, the scale 10 may be secured to a support 47 by any convenient means such as magnets 48. Although magnets are shown, it will be appreciated that other attaching means such as bolts, clips, glue, and the like, can be used to attach the scale 10 to a support 47 if desired. Otherwise, the scale 10 can be held manually in a horizontal position while weighing takes place.

Figure 4:
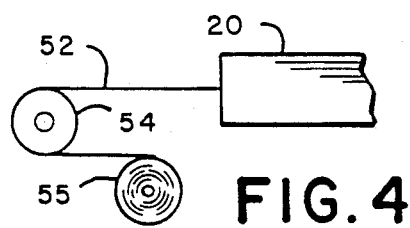
FIG. 4 shows an alternative embodiment for the slide mechanism of the weighing scale shown in FIG. 1.

Referring now to FIG. 4, an alternative embodiment is shown of the scale 10 wherein a spring 52 is trained about a first roller 54, and a second roller 55, whereby the flexible beam 20 may be spring biased to the left as shown in FIG. 4. This spring biasing would be in the direction of travel for moving the tape into the housing 12. With such a device, the detent combination of spring 42, ball 44 and openings 41 would act as a breaking mechanism, whereby as soon as the flexible beam 20 is moved beyond the detent, the spring 52 would urge the beam into the housing. More specifically, the spring 52 has sufficient force to overcome the sliding friction caused by the detent but not sufficient force to overcome the static function thereof.

Figure 5:
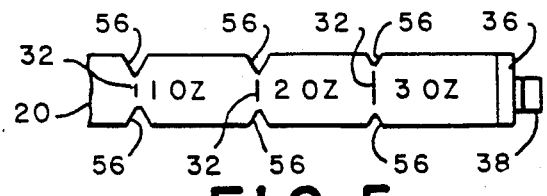
FIG. 5 is a plan view of an alternative beam that may be used in the weighing scale shown in FIG. 1.

Referring to FIG. 5, the tape is shown with series of variable notches 56 along both edges thereof. The notches 56 would be varied whereby the cross section of the tape would be reduced, thereby making less weight required to bend the tape at the fulcrum. These notches 56 are located at the locations of the marks 41 thereby causing breaking away of this flexible beam 20 at these locations.

In operation, when one is to weigh an object, such as an envelope 40, the object would be placed within the clip 38 so as to depend from the flexible beam 20. The flexible beam 20 would be moved by applying pressure upon the knob 26 in a direction such that the beam is moved outwardly. As pressure is applied against the knob 26, the flexible beam 20 will be guided by the channel 18 so as not to skew. The edge of the housing 12 at the location of the bottom of the first opening 14 serves as a fulcrum. In accordance with well known principles of physics, the length of a flexible beam 20 would be inversely proportional to the weight required to cause the tape to break away or bend. As seen in FIG. 1, the flexible beam 20 has certain marks 32 thereon to indicate the approximate weight of the envelope 40 secured by the clip 38. To determine the weight of an envelope, the housing 12 is positioned so that the beam assumes a horizontal posture, the envelope 40 is placed within the clip 38, and the flexible beam 20 is moved outwardly in a horizontal direction by exerting a force upon the knob 26. The further the flexible beam 20 is moved out, the lesser the weight required to cause the beam to break away. If the flexible beam 20 breaks away when the three ounce portion of the tape is exposed, it will be known that the weight of the envelope is at least three ounces. If the tape 20 does not break away, it is known that the weight is less than three ounces. Because of the presence of the detent formed by the spring 44, ball 46 and openings 41, an exact positioning of the beam 20 is achieved. Upon the flexible beam 20 not bending upon the 3 ounce mark being attained, the beam would then be moved outwardly once more to the next detent, and if the beam is bent, it would be known that the weight of the envelope 40 is between two and three ounces, but if there is no bending it is known that the envelope is lighter. Once more, the flexible beam 20 would be moved outwardly to the next detent position. If the flexible beam breaks away, it is known that the weight of the envelope is between one and two ounces, whereas if there is no breaking away, it is known that the weight of the envelope is less than once ounce. In this way, the range of weight of the envelope 40 can be determined. For purposes of placing postage upon a mail piece, this determination is sufficiently precise.

It will be noted that the clip 38 supports the envelope 40 so that the envelope depends therefrom. It is preferable that the center of gravity of the envelope 40 remain at the immediate distal end of the flexible beam 20.

Throughout the specification the terms "break away" and "bent" are used. By these terms it is meant that the flexible beam 20 will remain longitudinally rigid until the weight of an envelope 40 held by the clip 38 imparts a sufficient leveraging force to cause the beam to yield at the location of the housing opening 14 which serves as a fulcrum. Upon this occurring, the flexible beam 20 will no longer remain longitudinally rigid causing the envelope to drop a distance.

With regard to FIG. 3, it can be seen that the scale 10 can be placed on any object 47 such as a postage meter by the use of magnets 48. This provides a temporary attachment to any object, and the scale may be moved about after weights have been attained. For example, when postage is to be applied to an envelope but the weight is not known, the scale 10 may be placed on a postage meter, the envelope weighed and the appropriate postage amount can be input to the postage meter by the operator in a conventional manner. The overall size of the scale 10 will be approximately 6 inches long by 4 inches wide.

It has been found that using a flexible beam approximately ½ inches wide, 0.0091 inches thick, and having a radius of curvature such that a circle formed from such curvature would have a radius of 0.625", will produce the following results: for a one ounce object to bend such flexible beam 20, the beam had to be extended 8¾ inches; for the beam to bend with an envelope having 2 ounces of weight, the beam had to be extended 5 inches; and, for the beam to bend with 3 ounces thereon, the beam had to be extended 3.875 inches.

Referring now to FIG. 4, the flexible beam 20 is attached to the spring 52, and the spring can cause the beam to be moved from an extended position into the housing 12. The detent formed by the spring 44, ball 46 and opening 41 has sufficient holding power to prevent the spring from moving the beam 20, but upon the detent being overcome by pressure being applied to the knob 26, the spring 52 will then act upon the beam 20 retract it into the housing 12.

Referring now to FIG. 5, it can be seen that the cross section of the tape may be changed by making variable notches along the length thereof. In this way the cross section of the tape is reduced so that lesser weight or distance is required to bend the tape. Preferably, these notches are alignable at the edge of the housing 12 at the locations of the marks 32 to foster the breaking away of the flexible beam 20 under appropriate load.

In summary, what has been shown is a small, lightweight, inexpensive weighing scale that can be used where exact weighings are not required. The weighing scale is small and light so as to be movable as required.

What is claimed is:

1. A weighing scale comprising:
   a housing having a first opening therein,
   a flexible beam supported within said housing and having a variable portion of its length extending through and beyond said opening,
   said portion having means for supporting an article to be weighed, wherein said flexible beam will bend upon being extending and having an article attached thereto the length of the flexible beam at the moment of bending being inversely proportional to the weight of such article.

2. The weighing scale of claim 1 wherein said housing has a second opening therein adjacent said beam and said beam has a knob secured thereto that extends through said second opening whereby said beam may be extended by pressure being applied to said knob.

3. The weighing scale of claim 1 including detent means located within said housing for detenting said beam at selected locations of said beam.

4. The weighting scale of claim 3 including marks located on said beam that correspond to said detent means whereby upon said beam being at one of said selected locations one of said marks will be located at the edge of said housing.

5. The weighing scale of claim 1 wherein said means for supporting an article is secured to said portion.

6. The weighing scale of claim 1 including spring means supported in said housing and connected to said beam for biasing said beam is a direction away from said first opening.

7. The weighing scale of claim 6 including means for attaching said housing to a support.

8. The weighing scale of claim 7 wherein said attaching means is at least one magnet secured to said housing.

9. The weighing scale of claim 1 wherein said means for supporting an article is a generally L shaped plate secured to said exterior portion and having a clip attached thereto.

10. The weighing scale of claim 1 wherein said flexible beam has a curvalinear cross section.

11. The weighing scale of claim 10 wherein said detent means comprises a spring located within said housing, said spring being attached at one end to said housing and at its other end to said beam, a ball in engagement with and located between said beam and said spring whereby said spring urges said ball against one edge of said tape, said tape having a plurality of longitudinal openings therein adapted to receive said ball.

12. The weighing scale of claim 11 wherein said housing has a second opening therein that extends longitudinally in parallel with said beam and said beam has a knob secured thereto that extends through said second opening.

13. The weighing scale of claim 11 including marks located and spaced on said beam that correspond to said detent locations whereby upon said beam being at one of said selected locations one of said marks will be located at the edge of said housing.

14. The weighing scale of claim 10 including spring means supported within said housing and connected to said beam for biasing said beam in a direction that reduces the amount of beam extension.

15. A weighing scale comprising:
   a longitudinally extending housing having a first opening therein and a longitudinally extending channel located in the interior thereof and adjacent said first opening,
   a flexible beam slidably supported within said channel and having a variable portion of its length extending through and beyond said opening and exterior to said housing,
   said portion having means for supporting an article to be weighted, wherein said flexible beam will bend upon being extending from said housing and having an article attached thereto, the length of said flexible beam at the moment of bending being inversely proportional to the weight of such article.

16. The weighing scale of claim 15 including detent means located within said housing for detenting said beam at selected locations.

17. The weighing scale of claim 16 wherein said beam has openings therein alignable with said detent means.

18. The weighing scale of claim 15 wherein said means for supporting an article is a clip secured to said exterior portion.

19. The weighing scale of claim 15 wherein said beam has a variable cross sectional areas along its length.

20. The weighing scale of claim 15 wherein said beam has a curvilinear cross sectional area.

* * * * *